(12) United States Patent
Murphy

(10) Patent No.: US 10,794,613 B2
(45) Date of Patent: Oct. 6, 2020

(54) OVERFLOW PROTECTION AND MONITORING APPARATUS AND METHODS OF INSTALLING SAME

(71) Applicant: Kevin Michael Murphy, Paoli, PA (US)

(72) Inventor: Kevin Michael Murphy, Paoli, PA (US)

(73) Assignee: KEVIN MICHAEL MURPHY, LLC, Paoli, PA (US)

( * ) Notice: Subject to any disclaimer, the term of this patent is extended or adjusted under 35 U.S.C. 154(b) by 163 days.

(21) Appl. No.: 15/919,210

(22) Filed: Mar. 13, 2018

(65) Prior Publication Data

US 2018/0259222 A1 Sep. 13, 2018

Related U.S. Application Data

(60) Provisional application No. 62/470,678, filed on Mar. 13, 2017.

(51) Int. Cl.
*F16K 23/00* (2006.01)
*F24H 9/16* (2006.01)
(Continued)

(52) U.S. Cl.
CPC .............. *F24H 9/165* (2013.01); *B63J 4/002* (2013.01); *E03B 7/077* (2013.01); *E03C 1/104* (2013.01);
(Continued)

(58) Field of Classification Search
CPC .......................... F24H 9/165; Y10T 137/5762
See application file for complete search history.

(56) References Cited

U.S. PATENT DOCUMENTS

| 879,486 A | 2/1908 | McClellan |
| 1,114,247 A | 10/1914 | Gamble |

(Continued)

FOREIGN PATENT DOCUMENTS

| EP | 0196850 B1 | 10/1986 |
| GB | 2537611 | 10/2016 |

(Continued)

OTHER PUBLICATIONS

Sea Sense Dual Bilge Pump "Y" Valve.
Sea Sense, Dual Bilge Y Valve, Product Listing.

*Primary Examiner* — Reinaldo Sanchez-Medina
(74) *Attorney, Agent, or Firm* — Rita C. Chipperson; Chipperson Law Group, P.C.

(57) ABSTRACT

Overflow protection and monitoring devices capable of coupling to a drainage pan and may include: a drainage line; a base, the base including an input port; a dry section; and a wet section, the input port capable of coupling to the drainage pan; a base cover, the base cover removably coupled to the base, the base cover including a base cover output port capable of coupling to the drainage line; a fluid displacement mechanism located in the wet section, the fluid displacement mechanism including a fluid displacement mechanism output port; a fluid detection mechanism located in the wet section; and a base attachment, the base attachment coupled to the fluid displacement mechanism output port and the base cover output port, the base attachment including an air relief port and back-flow preventer; a control unit capable of energizing the fluid displacement mechanism upon receiving a signal from the fluid detection mechanism.

18 Claims, 13 Drawing Sheets

(51) Int. Cl.
*F24H 9/12* (2006.01)
*F16K 15/03* (2006.01)
*F16K 15/04* (2006.01)
*B63J 4/00* (2006.01)
*F16K 27/02* (2006.01)
*E03B 7/07* (2006.01)
*E03C 1/10* (2006.01)
*F16K 1/38* (2006.01)

(52) U.S. Cl.
CPC .............. *E03C 1/108* (2013.01); *F16K 1/385* (2013.01); *F16K 15/03* (2013.01); *F16K 15/044* (2013.01); *F16K 27/0254* (2013.01); *F24H 9/126* (2013.01)

(56) References Cited

U.S. PATENT DOCUMENTS

| | | | |
|---|---|---|---|
| 2,006,948 A | 7/1935 | Hazard et al. | |
| 2,810,398 A | 10/1957 | Carlson | |
| 3,069,671 A | 12/1962 | Taylor | |
| 3,444,881 A | 5/1969 | Harper | |
| 3,828,806 A | 8/1974 | Gios | |
| 4,037,427 A | 7/1977 | Kramer | |
| 4,180,088 A | 12/1979 | Mallett | |
| 4,487,021 A | 12/1984 | Arakawa et al. | |
| 4,811,753 A | 3/1989 | Bethune | |
| 4,909,274 A * | 3/1990 | Rodriguez | E03D 3/00 122/14.3 |
| 5,188,143 A | 2/1993 | Krebs | |
| 5,264,368 A | 11/1993 | Clarke et al. | |
| 5,345,224 A * | 9/1994 | Brown | F24H 9/165 340/605 |
| 5,632,302 A | 5/1997 | Lenoir, Jr. | |
| 5,645,103 A | 7/1997 | Whittaker | |
| 5,749,609 A | 5/1998 | Steele | |
| 5,844,492 A | 12/1998 | Buffin, Sr. | |
| 5,870,024 A * | 2/1999 | Arvelo, Jr. | G01F 23/0053 200/84 R |
| 5,881,762 A | 3/1999 | Janesky | |
| 5,957,545 A | 9/1999 | Sawada et al. | |
| 6,084,520 A * | 7/2000 | Salvucci | F24H 9/0005 200/61.04 |
| 6,135,133 A | 10/2000 | Ridgeway | |
| 6,276,309 B1 | 8/2001 | Zeek | |
| 6,318,403 B1 | 11/2001 | Fritz | |
| 6,543,471 B1 | 4/2003 | Carroll | |
| 6,736,535 B2 | 5/2004 | Halsall et al. | |
| 6,962,166 B2 | 11/2005 | Dudra | |
| 6,997,207 B2 | 2/2006 | McKesson | |
| 7,042,362 B2 | 5/2006 | Pai et al. | |
| 7,090,194 B2 | 8/2006 | Sampson | |
| 7,114,514 B2 | 10/2006 | Houle | |
| 7,171,978 B2 | 2/2007 | Nagler et al. | |
| 7,246,636 B2 | 7/2007 | Dudra et al. | |
| 7,253,741 B2 | 8/2007 | Fiorletta et al. | |
| 7,489,253 B2 * | 2/2009 | Murphy | G08B 21/20 137/312 |
| 8,013,749 B2 | 9/2011 | Murphy | |
| 8,297,300 B2 | 10/2012 | Abraham | |
| 8,643,497 B2 * | 2/2014 | Murphy | G01M 3/3245 137/312 |
| 10,281,171 B2 * | 5/2019 | Shaffer | F24H 4/04 |
| 2002/0033759 A1 | 3/2002 | Morello | |
| 2003/0177818 A1 | 9/2003 | Bronson | |
| 2004/0161227 A1 | 8/2004 | Baxter | |
| 2006/0169327 A1 | 8/2006 | Houle | |
| 2010/0018980 A1 | 1/2010 | Oakner et al. | |
| 2014/0196651 A1 | 7/2014 | Nirenberg | |

FOREIGN PATENT DOCUMENTS

| | | |
|---|---|---|
| GB | 2537611 A | 10/2016 |
| WO | 9220920 A1 | 11/1992 |
| WO | 014757 | 3/2000 |
| WO | 200014757 A1 | 3/2000 |
| WO | 2011062808 A2 | 5/2011 |
| WO | 062806 A2 | 6/2013 |

* cited by examiner

OVERFLOW PROTECTION AND MONITORING APPARATUS AND METHODS OF INSTALLING SAME

BACKGROUND OF THE INVENTION

Embodiments of the present invention generally relate to overflow protection and monitoring apparatus and methods of installing same. More specifically, embodiments of the present invention generally relate to apparatuses for detecting and containing leakage or overflow from a drain pain including, but not limited to, drain pans used in conjunction with fluid-filled devices. More specifically, the present invention relates to integral and/or portable, easy-to-install apparatuses for detecting fluid received from a drain pan, activating audible and/or visual alarms and, optionally an application such as a mobile application, and directing fluid to a predetermined drainage area to prevent damage to areas surrounding the drainage pan.

Many systems and methods have been created to prevent water damage caused by water heater leaks. Many such systems and methods have been created to shut off the flow of supply water to a water heater upon the occurrence of a leak. In its most simplistic form, such systems include a receptacle for containing the leaked water and a mechanism for activating shut-off of the water supply. One such system includes a pan placed underneath a hot water heater such that the entire water heater is located within or above the periphery of the pan. The pan is equipped with a float switch designed to generate an electronic shut-off signal whenever the float rises above a predetermined level due to water accumulation in the pan. The generated electronic shut-off signal then actuates solenoid valves located in the water and gas supply lines causing them to close and, thereby, shutting off the water and gas supply to the hot water heater. Also, such systems may optionally include an overflow port, or the like connected to a hose for removal of the water from the pan and a programmable message device such as a tape recorder to alert a user that there has been a leak in the system. Other similar systems may include a commercially available alarm in lieu of a programmable message device.

Similarly, other water heater leak protection systems have been created having a platform for the water heater in the center of the pan. The platform elevates the water heater with respect to the pan to prevent damage to the water heater during an overflow situation. In one such system, a float switch and a pump are included within a housing located in the interior of the pan. The base of the housing includes an opening through which water may enter to activate the float switch when a leak occurs. In turn, the float switch simultaneously actuates a shut-off valve attached to the water supply line to shut off the water supply and activates a pump to remove the water from the pan. The water may be pumped through a hose to a sewer or drainage system.

Yet another water heater leak protection system includes a water heater jacket that surrounds at least a portion of the water heater. Upon the occurrence of a water leak, as detected by a moisture sensor located between the water heater tank and water heater jacket, the moisture sensor transmits a disconnect signal to a water heater jacket control system. This disconnect signal prevents the heating element from heating the water contained in the water heater tank. The control system additionally initiates closing of a solenoid valve to prevent supply water from entering the water heater tank.

Another such system having a moisture sensor is designed to detect water leaked by water heater systems but may also be used to detect leaks in a sink, air conditioning unit, washing machine, or toilet. In some such systems, upon the occurrence of a leak, one or more moisture sensors transmit a wireless signal to a wireless transceiver. The transceiver then transmits a second wireless signal to an alarm or telephone system that alerts the system user that a leak has occurred. The leak detection system may optionally include a shut-off valve that shuts off the water supply to the water-filled device via wireless actuation of the shut-off valve.

BRIEF SUMMARY OF THE INVENTION

Briefly stated, in one aspect of the present invention, overflow protection and monitoring apparatus are provided. In another aspect of the convention, methods for installing an overflow protection and monitoring apparatus are provided.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
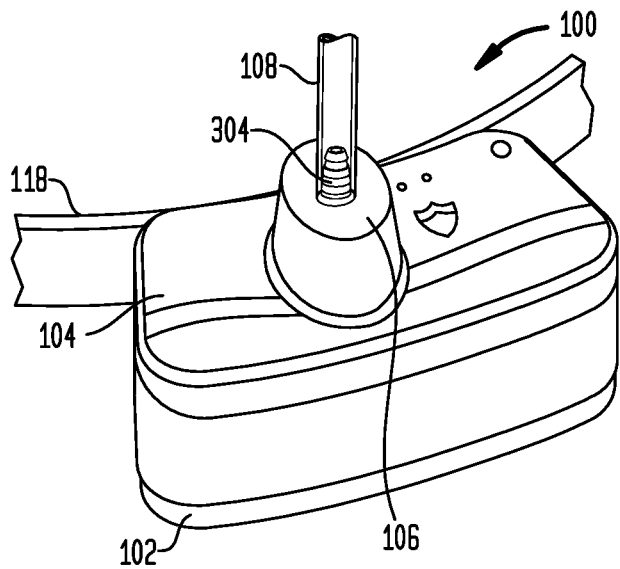
FIGS. 1A and 1B are angled perspective views of an overflow protection and monitoring apparatus coupled to a drainage pan in which a fluid-filled apparatus may be located in accordance with one embodiment of the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Definitions

MNPT=Male national pipe thread

FNPT=Female national pipe thread

Overflow protection and monitoring apparatus is provided herein. These apparatuses are easy to install and may be installed by any homeowner including those with no expertise in the installation of such systems. The overflow protection and monitoring apparatus of the present invention may be used in conjunction with any one of a variety of fluid-filled devices and/or drainage/containment pans including, but not limited to, hot water heaters, air conditioning units, dehumidifiers, humidifiers, water coolers, planters, aquariums, and/or drainage and/or containment pans therefore. Upon discharge of a fluid from such a device or into such a pan, the overflow and monitoring apparatus of the present invention contains the fluid within a reservoir and, upon detection of the presence and/or height of such fluid, discharges the fluid via a fluid conduit to one or more predetermined drainage areas, thereby preventing damage to the property or surfaces surrounding the fluid-filled device and overflow and monitoring apparatus. Since the overflow and monitoring apparatus of the present invention is not dependent on gravity for drainage, it may be used in any location and the drainage line associated with the overflow and monitoring apparatus may be easily routed to the desired drainage location.

Figure 1B:
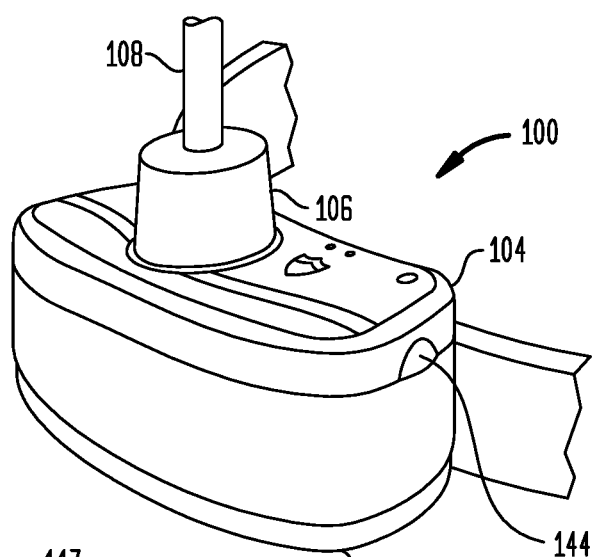
Figure 1C:
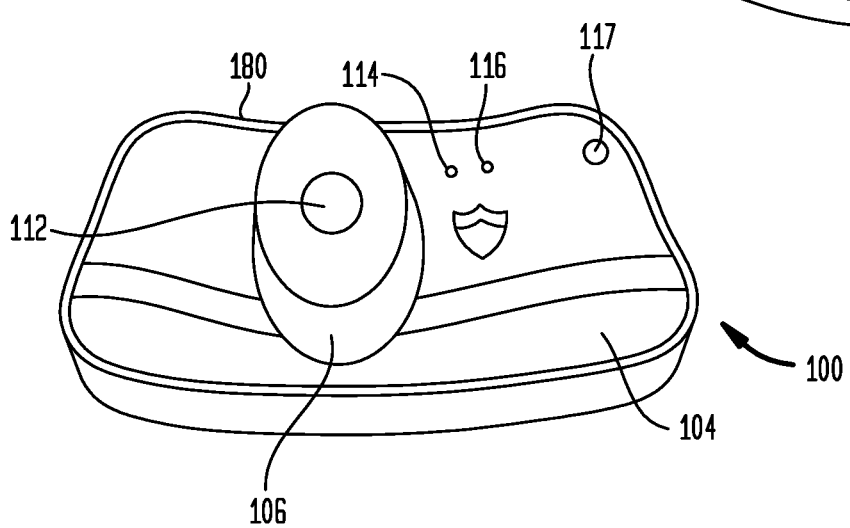
FIG. 1C is a top view of an overflow protection and monitoring apparatus coupled to a drainage pan in which a fluid-filled apparatus may be located in accordance with one embodiment of the present invention.

Turning now to FIGS. 1A through 1C, depicted are perspective and top views of an exemplary fluid apparatus 100 in accordance with one embodiment of the present invention. This exemplary apparatus includes, inter alia, base 102, base lid 104, base lid extension 106, and drainage line 108. As best seen in FIG. 1C, base lid extension includes a base lid aperture 112 through which base attachment 302 extends to facilitate connection to drainage line 108. As also seen in FIG. 1C, in the depicted embodiment, base lid 104 includes fault indicator 114, ready indicator 116, and silence button 716. The indicators alert the user to the presence of a fault and operational status, respectively, of the apparatus 100, and the silence button 716 allows a user to silence audible alarms and, optionally, associated applications such as mobile applications.

As also seen in FIG. 1C, one of the longitudinal sides 180 of apparatus 100 is slightly indented in a curved manner and/or slightly concave. This curvature allows apparatus 100 to be installed snugly against a substantially circular drain pan as commonly found in use with standard fluid-filled devices such as water heaters and the like. As shown in FIGS. 1A and 1B, apparatus 100 is mounted to the exterior of the drain pan wall as discussed in greater detail below with regards to FIGS. 2A and 2B.

Figure 2A:
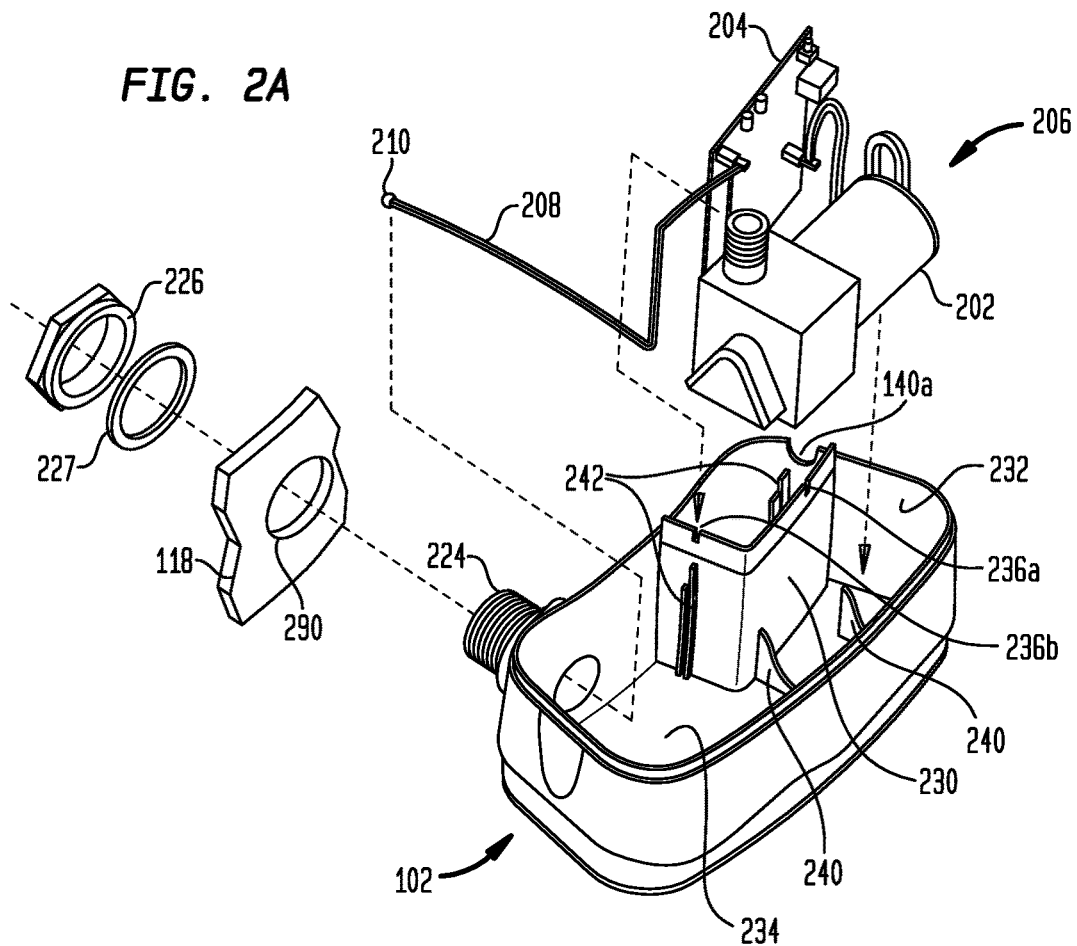
FIGS. 2A and 2B show exploded and assembled views, respectively, of an interior assembly coupled to a base in accordance with the embodiment of the present invention depicted in FIG. 1, the interior assembly including a control board, sensors, and fluid displacement mechanism.
Figure 2B:
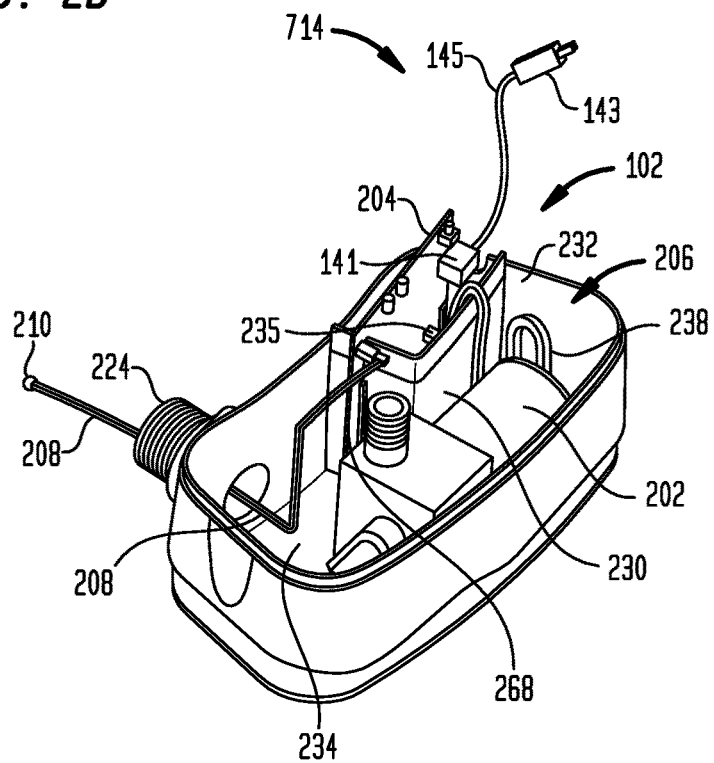

Turning next to FIGS. 2A and 2B, depicted are perspective views of base 102 with base lid 104 removed. FIG. 2A depicts an exploded view of the base 102 with its interior assembly 206 removed, and FIG. 2B depicts base 102 with interior assembly 206 installed. In the depicted embodiment, interior assembly 206 includes fluid displacement mechanism 202, control board 204, pan sensor connector 208, low level sensor 220, high level sensor 222, and pan sensor 210.

With regards to base 102, it can be formed in any geometrical shape to accommodate different drain or containment pan configurations including, but not limited to, round, square, kidney, and triangular shapes. In the depicted embodiment, the base and base lid are formed in a shape that is compatible with a round drain pan. Other shapes compatible with varying drain pan shapes may also be substituted. Base 102 and base lid 104 are injection molded, but could be made using other molding techniques including, but not limited to: compression molding, CRC, and 3D printing.

The base and lid will be made of the best suited material available in the plastic or vinyl categories but can be made from any other structural material that is fluid proof and accommodate the dimensions of apparatus 100 and the demands of the fluid to be contained by apparatus 100. The material should be rated as per the temperature and composition of the fluid in the device being protected and monitored. Fluids may include, but are not limited to, water.

In the depicted embodiment, the base has a lid that closes via a snap fit, but alternate attachment mechanisms may be substituted. Also, the base lid may or may not have a fluid tight fit without departing from the scope of the present invention. Base 102 should have the ability to hold the weight of the electronic and mechanical components, and fluid volume, that may be contained therein.

Additionally, in the depicted embodiment, the base's vertical side is taller than the sidewall height of the containment/drainage pan to which apparatus 100 is attached. This allows the fluid in the pan 118 to overflow before the fluid in the base reaches the overflow opening 270a and 270b in the base lid.

Further, base 102 has an interior vertical wall 230 molded into and coupled to the exterior wall 232 of the base in two different locations and the floor of the base along its entire length, thereby creating a fluid proof area 235 in base 102. The top of interior vertical wall 230 has two "U" shaped indentations 236a and 236b. A first indentation 236a acts as a conduit for the fluid displacement mechanism connector 238 to connect from fluid displacement mechanism 202 to control board 204. The second indentation 236b assists with the proper seating and alignment of control board 204. In the depicted embodiment, control board 204 is fluid proof on the portion contained within the wall 232 and includes electronic components not intended to contact a fluid. In the depicted embodiment, the bottom of fluid proof area 235 includes at least one aperture to provide ventilation of the control board 204 and to allow any fluid that might enter this area to discharge. Control board 204 extends slightly into the fluid reservoir as this portion 268 of control board 204 includes the high and low-level sensors 222 and 220, respectively, as discussed in greater detail below.

In the depicted embodiment, the base includes structures 240 molded into the interior of the fluid reservoir's floor which will cradle and trap the housing of fluid displacement mechanism 202. The base also includes two sets of vertical parallel abutments 242 to hold the control board 204 in place. One side of each parallel sets is shorter than the other side to accommodate an easier insertion of the control board 204.

The base lid 104 will complete the separation of the fluid reservoir 234 from the fluid proof area 235 and, therefore, the electrical components on the control board 204 by overlaying the internal wall 230. Base lid 104 will also have two "U" shaped indentations that align with the indentations 236 in interior wall 230, which will be used for the same purpose such as, but not limited to, alignment of control board 204 and passage of connector 238.

In some embodiments such as the depicted embodiment, base lid 104 has a substantially flat top with a base lid extension 106 extending from the top thereof. In the depicted embodiment, extension 106 has an ovate cross section. The top surface of lid extension 106 includes an aperture 112 through which the outlet 304 of base attachment 302 extends such that drainage line 108 can be connected thereto from the exterior of apparatus 100. In some embodiments, outlet 304 is barbed and drainage line 108 is a plastic tubing, but the invention is not so limited. Alternate forms of outlet 304 and drainage line 108 may be substituted. In some embodiments, lid extension 106 is sized an/or includes an interior wall 272 molded to a shape that contacts the base attachment 302 in a manner that retains it in the desired position. Further, this interior wall is designed to allow the user to align the base attachment 302 in only one direction. Such shape prevents a user from placing the base attachment 302 in the apparatus in an undesirable position. However, alternate embodiments of the invention are envisioned in which the lid extension is omitted or has a different configuration. For example, when lid extension is omitted, base lid may be flat with an aperture and the base attachment 302 may be located external to the base 102.

Figure 2C:
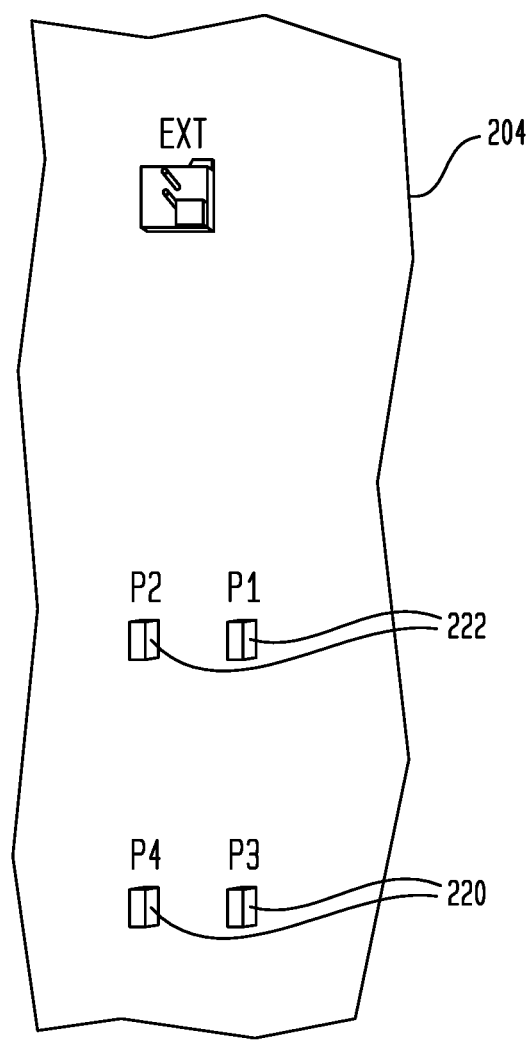
FIG. 2C is an enlarged view of a portion of a control board including high and low-level sensors in accordance with the embodiment of the present invention depicted in FIG. 1.
Figure 2D:
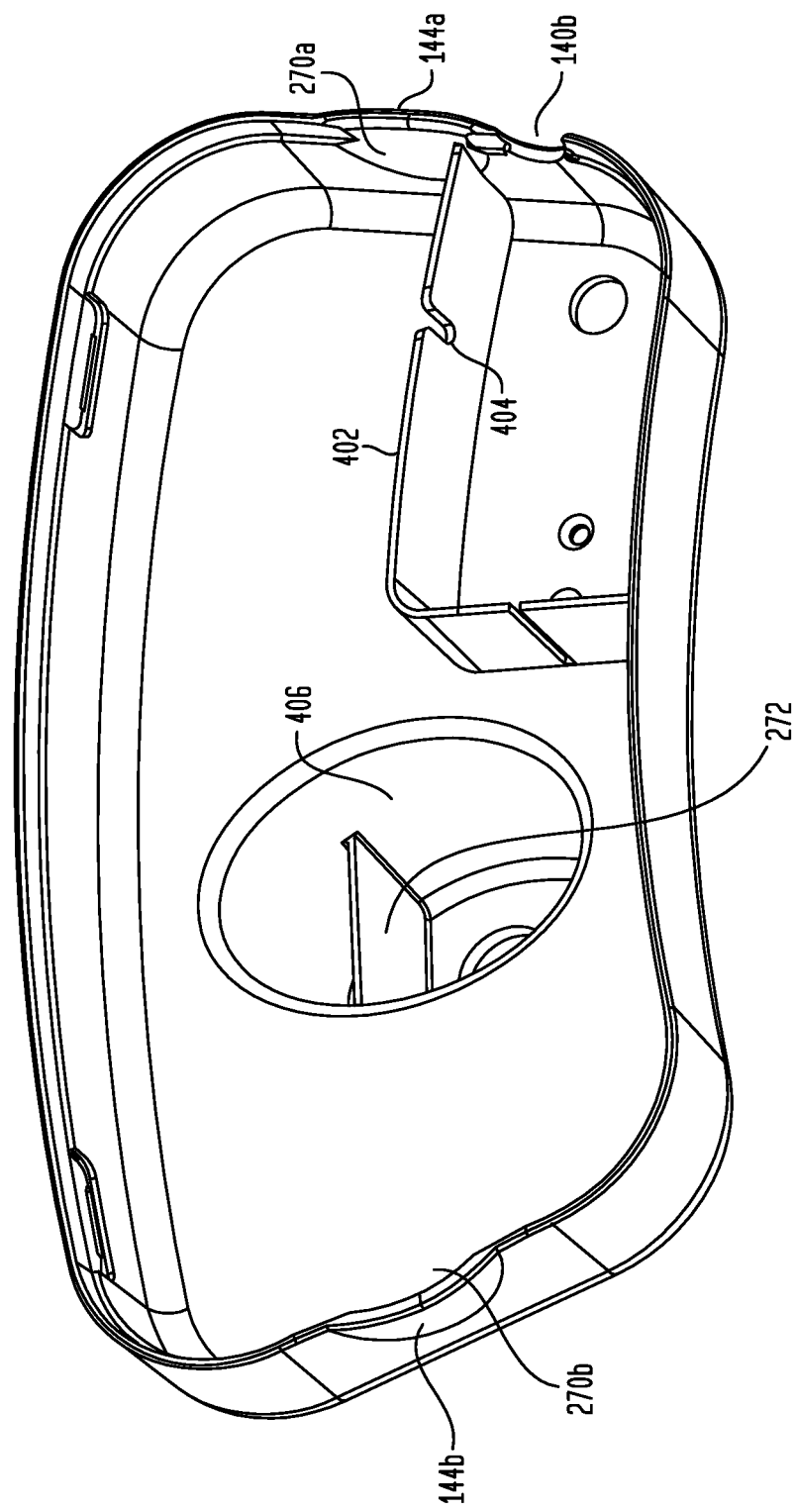
FIG. 2D is an angled bottom view of a base lid in accordance with the embodiment of the present invention depicted in FIG. 1.

Additionally, as best seen in FIG. 1B and 2D, the base lid 104 includes handles 144a and 144b on the vertical sides of either end of base lid 104. The handles are substantially convex and extend outwardly beyond the vertical wall of the base 102. This configuration allows a user to easily remove the lid by placing his or her hand under the handle 144a and/or 144b and lifting upward. The openings 270a and 270b underneath handles 144a and 144b, respectively, also allow air to be displaced from the fluid reservoir during the filling and emptying of the fluid reservoir as described herein. Also, such openings 270a and 270b allow air and/or fluid to escape for overflow and/or ventilation purposes.

Additionally, in the depicted embodiment, base lid 104 will have three apertures in the top surface thereof. Two of the apertures will allow visual alarms such as, for example, LED lights on the control board 204 to illuminated fault and ready signals to the users through fault and ready apertures 114 and 116, respectively. The third silence aperture 117 will provide the user with access to a silence button 716 located on or proximal to the control board 204. Base lid 104 will include a slight recess on its top surface to accommodate an overlay sticker that will identify the visual alarms and silence button locations. The various components of apparatus 100 may be optionally molded together as one piece or as separate pieces.

Figure 3A:
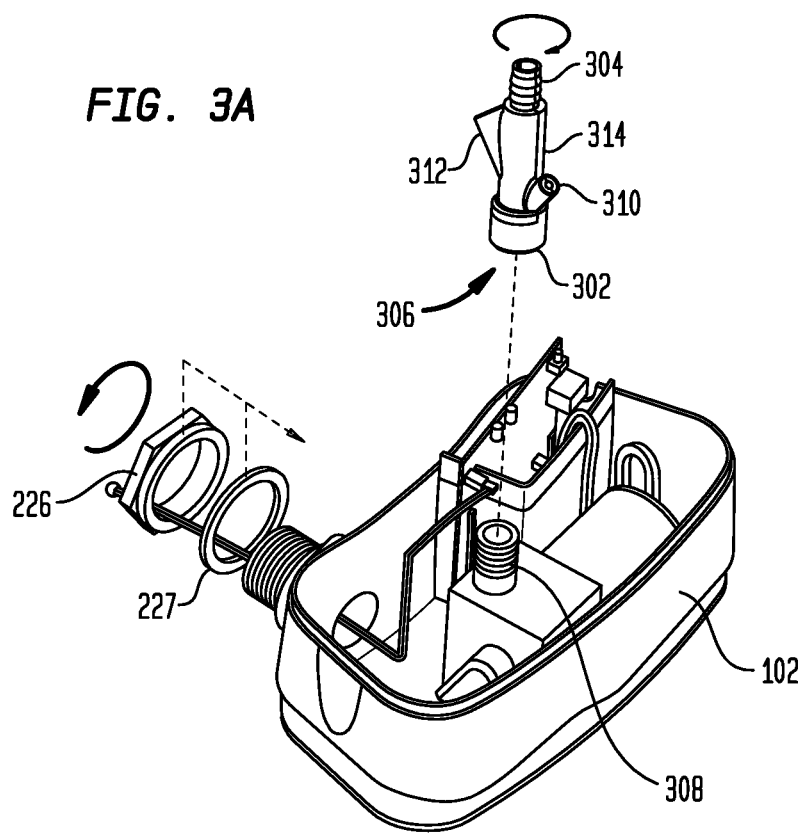
FIGS. 3A and 3B show exploded and assembled views, respectively, of a base attachment coupled to a base in accordance with the embodiment of the present invention depicted in FIG. 1, the base attachment including an air release and backflow preventer.
Figure 3B:
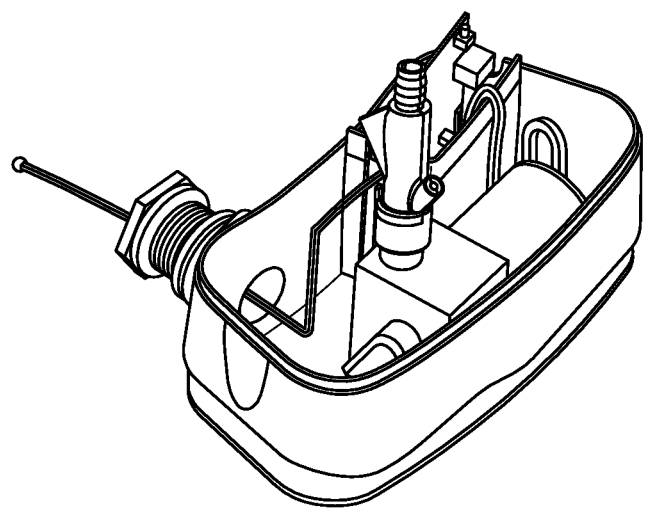
Figure 4:
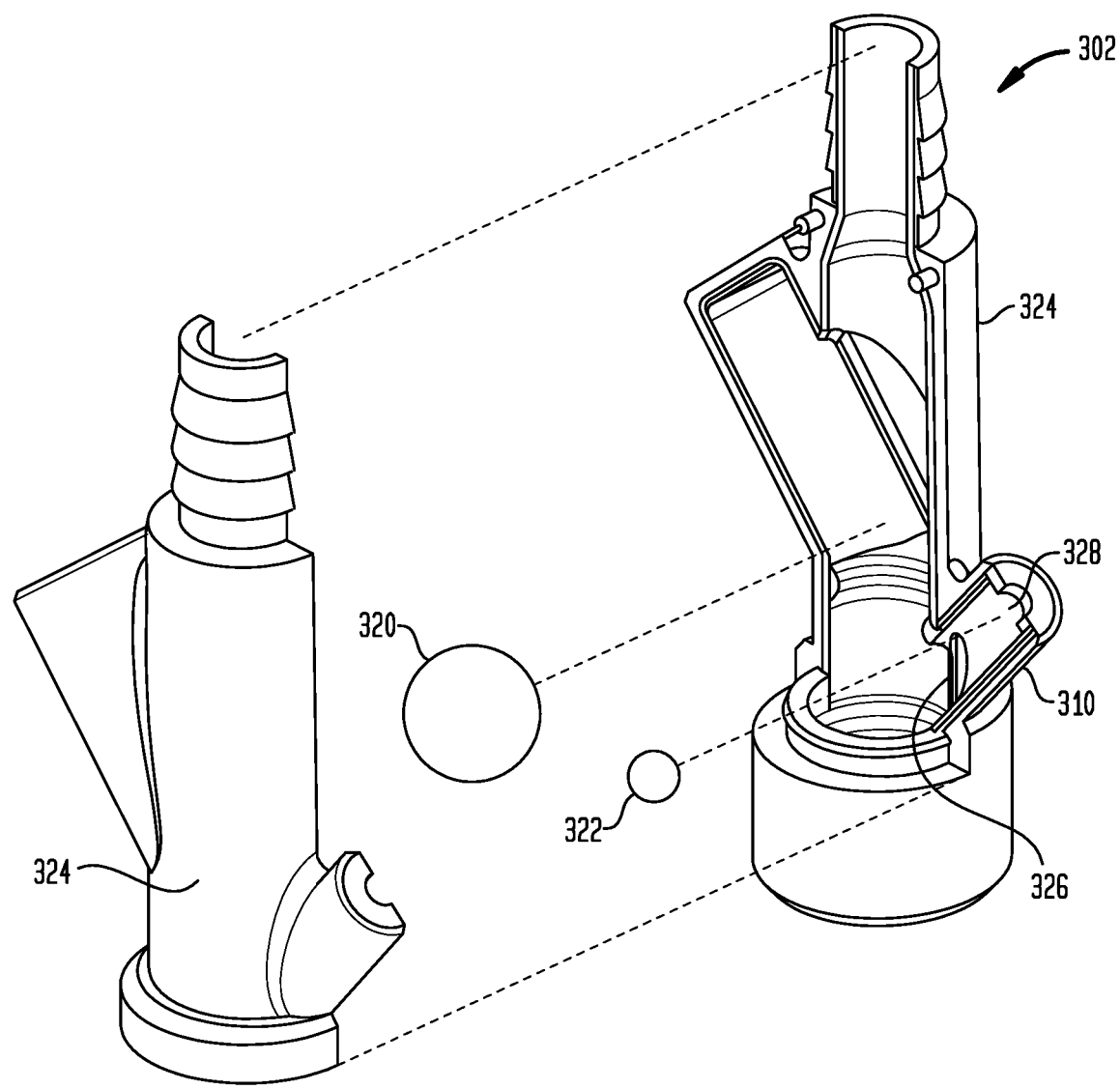
FIG. 4 shows an exploded view of a base attachment in accordance with the embodiment of the present invention depicted in FIG. 1.

In the depicted embodiment, fluid displacement mechanism 202 is a 24-volt submersible centrifugal pump manufactured by SCC Pumps, Inc. having model no. DC24. The pump is a submersible 24-volt non-brushless centrifugal pump; however, alternate fluid displacement mechanisms may be substituted without departing from the scope hereof. The pump discharge outlet will be vertical and has an MNPT threaded discharge pipe designed to accommodate connection to the inlet 306 of base attachment 302. As seen in FIGS. 3A and 3B, base attachment 302 will be threaded on to the pump discharge outlet 308 such that it is substantially vertical, and it includes two legs 310 and 312 thereof extending therefrom at angles of approximately 45 degrees. The vertical leg 314 will be utilized for passage of the fluid discharged from fluid displacement mechanism 202. Diagonal leg 310 will provide air relief. The suction side of the pump will have an "A" frame suction pickup.

In the depicted embodiment, base attachment 302 is a multi-functional attachment that includes an air release 310 and a back-flow preventer 312, which purge air from a non-priming fluid displacement mechanism 202 and stop discharged fluid from re-entering the fluid reservoir 234. Base attachment 302 receives the fluid discharged from the fluid displacement mechanism 202. One purpose of the base attachment 302 is to evacuate the air from the impeller chamber of the fluid displacement mechanism 202. This is necessary when the fluid displacement mechanism is a pump that is not self-priming. If air is present in such a pump mechanism, an air pocket will form, and cavitation will occur (i.e., the pump will spin and not pump any fluid). Base attachment 302 also includes back-flow preventer 312, which traps the fluid in the pipe and does not let the fluid flow backwards towards the discharge chamber of the fluid displacement mechanism 202. Base attachment 302 can be manufactured as a single piece or as several pieces. The pieces can be attached to each other by methods including, but not limited to, adhesives, screws and sonic welding.

Base Attachment 302 Operation: As the fluid starts filling the fluid reservoir 234, the rising fluid displaces the air in the reservoir and fluid displacement mechanism housing. This air in the fluid displacement mechanism housing will exit the fluid displacement mechanism housing through aperture 328 in the top end of air release 310. Air will travel in this direction due to the spherical shaped obstruction 320 that closes off the discharge tube 324 past the intake 326 of the air release 310. Obstruction 320 also acts as a backflow preventer for fluid that may be in the discharge tube 324 or backflow preventer 312. Obstruction 320 and 322 may be shapes other than spherical without departing from the scope of the present invention, and the interior walls of attachment 302 may be modified accordingly.

When the fluid displacement mechanism 202 turns on, (e.g., when the fluid level closes the circuit on control board 204 signaling the control unit 730 to activate the fluid displacement mechanism 202), the pressure caused by the fluid discharging the fluid displacement mechanism 202 causes obstruction 322 to move into air release 310, thereby closing it (i.e., via covering of discharge aperture 328) while simultaneously moving obstruction 320 into backflow preventer 312 which allows the fluid to pass through the body 324 of base attachment 302, thereby resulting in a working primed fluid displacement mechanism.

When the fluid displacement mechanism turns off (e.g., when the sensors indicate that the fluid level no longer exceeds the height of the low level sensor as per steps 504 and 510 of process 500), obstruction 320 drops down due to gravity and forms a seal at the base of base attachment 302, which acts to stop or minimize the ability of discharged fluid to flow downward to the discharge of the fluid displacement mechanism and/or into the fluid reservoir 234. Obstruction 322 also simultaneously drops due to gravity. This cycle will automatically repeat itself as the fluid displacement mechanism 202 is energized and de-energized.

In the depicted embodiment, obstructions 320 and 322 are spherically shaped, weighted, and made of stainless steel, however, alternate shapes and materials may be substituted without departing from the scope hereof. For applications in which apparatus 100 is used to monitor fluids having corrosive properties or high temperatures, such obstructions may be made from materials including, but not limited to plastic, nickel, and brass. The size of the obstruction will directly correlate to the seal required to be made in base attachment 302.

Further, in the depicted embodiment, low-level sensor 220 and high-level sensor 222 are located on control board 204 on the fluid exposed portion 268 of the control board 204 as shown in the partial view of control board 204 as depicted in FIG. 2C. As seen in FIG. 2C, the sensors are located at varying heights to detect water at varying levels. These sensors are conductivity sensors in the form of a pair of solder pillows (per sensor) as shown in FIG. 2C.

Pan sensor 210 is also a conductivity sensor as described above for low level sensor 220 and high-level sensor 222, however, pan sensor 210 is located in the drainage pan 118 and is connected to the control board 204 via connector 208. Pan sensor 210 includes two pieces of wire laying in the drainage pan 118. The ends of the wires are bare to allow them to detect the fluid. However, other types of sensors may be substituted for low level sensor 220, high level sensor 222, and pan sensor 210 without departing from the scope hereof including, without limitation, pressure sensors.

Base 102 includes overfill apertures in the openings 270a and 270b between handles 144 and base 102 that prevent the fluid from exceeding the height of the control board 204 and, therefore, entering the fluid proof area 235. Fluid could rise to this level if the fluid displacement mechanism 202 is not able to remove the fluid as fast as it enters the fluid reservoir 234. Fluid displacement mechanism failure, power failure, or a large leak in the device being monitored could cause the fluid to reach the overfill level.

Figure 7:
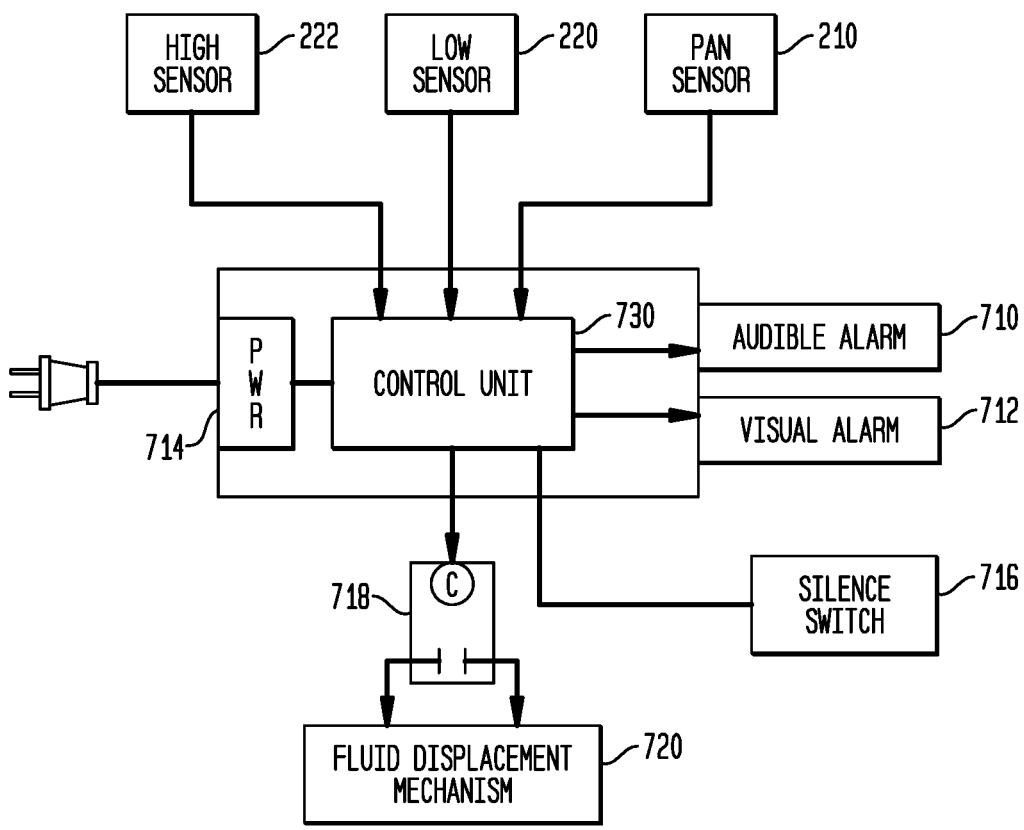
FIG. 7 is a schematic view of one embodiment of a control unit of the embodiment of the present invention depicted in FIG. 1.

Additionally, in the depicted embodiment, control board 204 is a printed circuit board equipped with a microprocessor or the like, or other control components, capable of executing a process such as that depicted in FIG. 5 as discussed in greater detail below. As best seen in FIG. 7, in the depicted embodiment, control board 204 includes a control unit 730 such as a microprocessor or the like. In the depicted embodiment, the microprocessor is manufactured by Expressif and has model no. ESP8266. However, alternate control units may be substituted without departing from the scope hereof.

Control unit 730 receives inputs from the low-level sensor 220, high level sensor 222, pan sensor 210, and factory test button 716. Control unit 730 controls outputs to displacement mechanism 202, audible alarm 710, and visual alarm 712. However, it should be noted that alternate embodiments are envisioned with a lesser or greater quantity of inputs and outputs without departing from the scope hereof. Further, control unit 730 receives power from a power supply 714 that is compatible with a 120-volt receptacle. In the depicted embodiment, power supply 714 is a 24-volt UL-listed wall adaptor with transformer (i.e., it transforms standard receptacle 120 volt into a 24-volt power supply) such as the Wall Mount AC Adaptor 60-Watt, 24 Volt, 2.5 Amp USA Plug Level VI adaptor as manufactured by Mean Well having model no. SGA60U24-P1J. Power supply 714 also supplies power for the fluid displacement mechanism 202, control board 204, and all associated inputs and outputs thereto. The connector input 141 for power supply 714 is powered by 120-volt plug 143 and associated cabling 145, which passes through the substantially circular aperture formed by semi-circular recesses 140a and 140b in the base 102 and base lid 104, respectively. However, alternate power supplies may be added or substituted without departing from the scope hereof including, without limitation, batteries.

Referring back to FIGS. 2A and 2B, in the depicted embodiment, base 102 includes pan connector 224, which allows apparatus 100 to be coupled to drain pan 118 as depicted in FIGS. 1A and 1B. Specifically, pan connector 224 is passed through a discharge aperture 290 (e.g., a knockout) or other aperture in drain pan 118, and a fastener 226 and, optionally, washer 227, is coupled to pan connector 224, thereby sandwiching the wall of drain pan 118 therebetween and coupling apparatus 100 to drain pan 118. In the depicted embodiment, pan connector 224 is an MNPT threaded nipple molded into the exterior side of base 102 at approximately the same position as the discharge aperture 290 in the containment/drainage pan 118 to which it will be coupled (i.e., the drainage pan of the device apparatus 100 will be monitoring). The nipple may include a stop that has a larger outside diameter than the nipple and drainage discharge aperture 290. Washer 227 may be a rubber washer and fastener 226 may be a FNPT nut, which, when tightened, acts to create a fluid tight seal between the drainage base 102 and the containment pan 118.

Further, as depicted in FIG. 2B, after installation of interior assembly 206, pan sensor connector 208 is routed through base connector 224 to allow pan sensor 210 to be installed in drain pan 118. In some embodiments, pan sensor 210 simply rests in drain pan 118. In other embodiments, pan sensor 210 is adhered to drain pan 118 via, an adhesive, however alternate methods of affixing and/or installing and sensor up 210 may be substituted without departing from the scope hereof.

Figure 5:
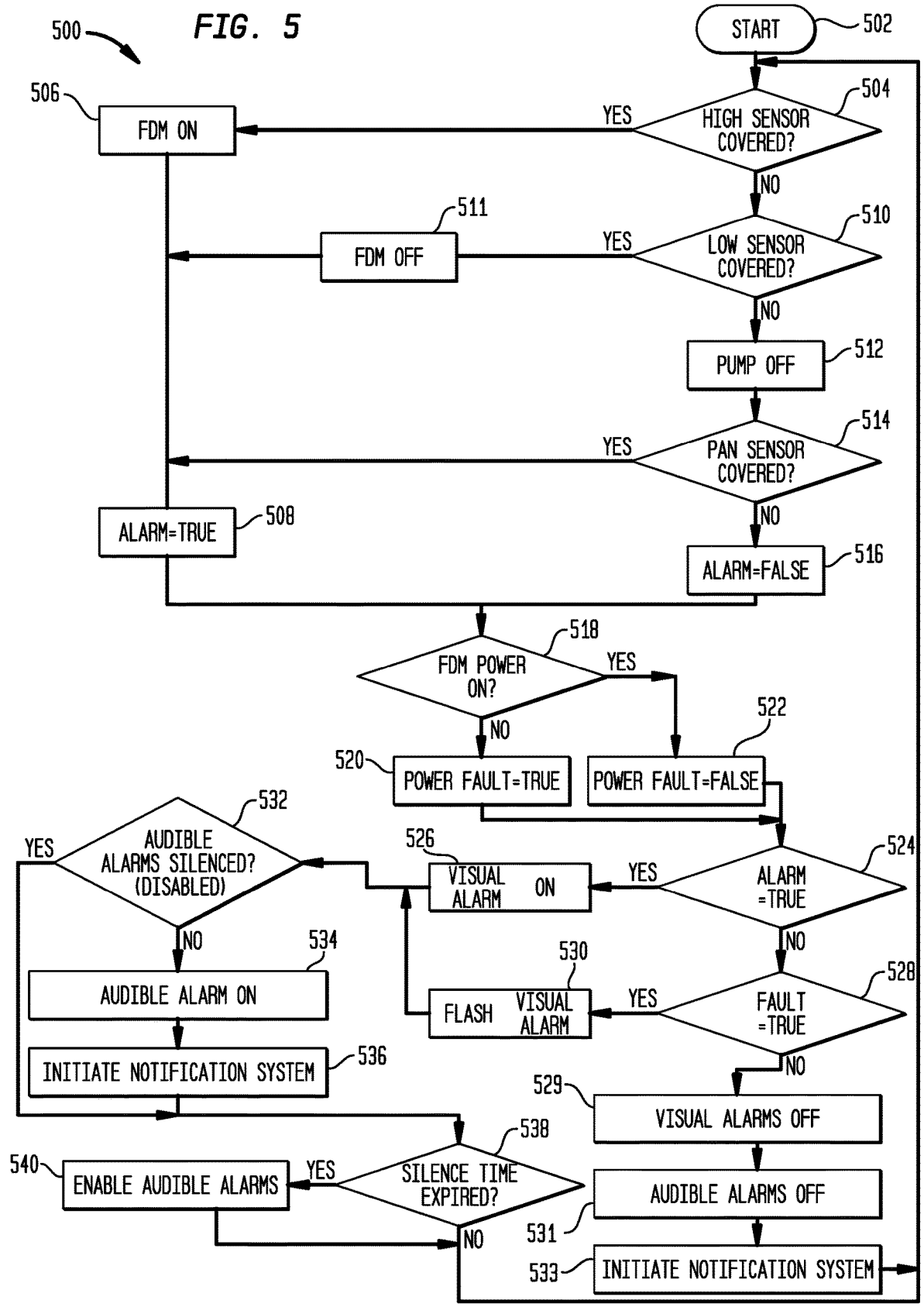
FIG. 5 is a flowchart depicting the operation of a control unit in accordance with the embodiment of the present invention depicted in FIG. 1.
Figure 6:
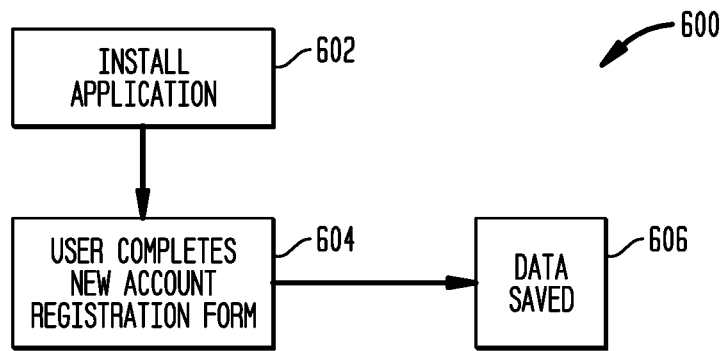
FIG. 6 is a flowchart depicting an account registration function of an application designed for use with the embodiment of the present invention depicted in FIG. 1.

Turning now to FIG. 5, depicted is process 500. Process 500 runs continuously whenever control board 204 is energized. Process 500 begins at 502. Next at 504, process 500 queries whether the high-level sensor 222 is activated (i.e., whether it has sensed a high level of fluid). This will occur if a fluid filled apparatus associated with the drainage pan 118 leaks fluid into the drainage pan 118. Such fluid will contact pan sensor 210 and will flow through connector 224 into fluid reservoir 234. When the height of such fluid rises, it will reach and activate low level sensor 220. If the fluid continues to rise, it will also activate high level sensor 222. All three of these sensors are wired as inputs to the control unit 730 as shown in FIG. 7.

If the high-level sensor is activated, process 500 proceeds to 506, at which the fluid displacement mechanism 202 is energized. In the depicted embodiment, fluid displacement mechanism 202 is energized by control unit 730, which is a computing device as described herein. However, alternate embodiments are envisioned in which fluid displacement mechanism is energized via a float device, pressure sensor, or the like. In such scenarios, notification that the fluid displacement mechanism 202 is running could be provided to a control unit 730, if utilized, via a pump running status switch wired to an input of control unit 730 or the like. Or control unit 730 could be omitted. Also, embodiments are envisioned in which other items may be energized and/or activated at the same time as fluid displacement mechanism 202 including, without limitation, one or more of a valve, camera, and a light. This may be done with or without a relay. In the depicted embodiment, fluid displacement mechanism 720 is controlled via relay 718 which has a 24-volt coil.

Process 500 then proceeds to 508 at which the value for the alarm data variable is set to true. Alternatively, if at 504, the high-level sensor is not activated, process 500 proceeds to 510, at which it queries whether the low-level sensor 220 is activated (i.e., whether it has sensed a low level of fluid). If yes, process 500 proceeds to 511, at which the fluid displacement mechanism is deactivated, and thereafter to 508, at which the alarm data variable is set to true. In the depicted embodiment, it is desirable to de-energize the fluid displacement mechanism 202 before the fluid reservoir has been pumped dry of fluid since most fluid displacement mechanisms are not designed for continuous use. However, alternate fluid displacement mechanisms may be substituted that will allow for such continuous use.

Alternatively, if at 510 the low-level sensor is not activated, process 500 proceeds to 512, at which the pump is de-energized or remains off. Process 500 then proceeds to 514, at which it determines whether a fluid has covered the pan sensor 210. If yes, process 500 proceeds to 508, at which the value for the alarm data variable is set to true. If no, the process 500 proceeds to 516, at which the value for the alarm data variable is set to false. In either scenario, process 500 then proceeds to 518 at which it queries whether the fluid displacement mechanism has power.

If, at 518, process 500 determines that the fluid displacement mechanism 202 has power, process 500 proceeds to 522, at which the fluid displacement mechanism power fault data variable is set to false. Conversely, if at 518, process 500 determines that the fluid displacement mechanism is not energized, the fluid displacement mechanism power fault variable is set to true. This may occur, for example, during a power loss or if the fusible link for the fluid displacement mechanism 202 has been broken. In either scenario, process 500 proceeds to 524, at which it determines whether the alarm data variable has been set to true. If, at 524, the alarm data variable is set to true, process 500 proceeds to 526, at which the visual alarm (e.g., an alarm lamp) is energized. If, at 524, the alarm data variable does not equal true, process 500 proceeds to 528. At 528, process 500 queries whether the fault variable equals true. If yes, process 500 proceeds to 530 at which the visual (e.g., a lamp) is set to flashing mode, and process 500 proceeds to 532. At 532, process 500 queries whether the audible alarm is set to silence. This occurs, for example, if the user depresses silence switch 716. If no, process 500 proceeds to 534 at which the audible alarm is energized. Next, process 500 proceeds to 536, at which a notification system is initiated to notify the user of the occurrence of an alarm. The method of initiation will be dependent upon the type of notification system incorporated which system may include, but is not limited to, voice message notification, text message notification, an auto-dialing system, a home security system, and the like. In the depicted embodiment, notification system is an application, possibly a mobile application, as described herein with respect to FIGS. 6 and 8A-11. The notification is performed via a push notification sent to the computing device executing the application.

After 536, process 500 proceeds to 538, at which it queries whether the silence time has expired. In some embodiments, the silence time is twelve hours, but the invention is not so limited. Also, in the depicted embodiment, the silence switch 716 silences the audible alarm only and the visual alarms remain lit. If yes, process 500 proceeds to 540, at which the audible alarms are re-enabled. If, at 538, the silence time has not expired, or if process 500 has executed 540, process 500 returns to 504 and repeats.

If at 528, fault is not true, there are no longer any alarms present in the system and process 500 proceeds to 529, at which the visual alarms are disabled. Next, at 531, audible alarms, if active, are also disabled. If they have been silenced, they remain in silence mode. Thereafter, process 500 proceeds to 533 at which the notification system is initiated to alert it that a message can be sent to the user that there is no longer an alarm present. In some embodiments, this notification will be disabled if the user has set the system to silent mode. Process 500 then returns to 504, at which it repeats.

Turning next to FIGS. 6 and 9-11, depicted are flowcharts of the operation of an application, for example a mobile application, for use with the present invention. Such an application may operate in an environment such as depicted in FIG. 8B. Turning now to FIG. 8B, FIG. 8B represents an exemplary computing system environment for allowing a user of a computing device 802 (described in detail below) to receive content via a network and/or server such as server 804 and to perform the techniques described herein with respect to FIGS. 6 and 9-11. The depicted computing system environment is only one example of a suitable computing environment and is not intended to suggest any limitation as to the scope of use or functionality. Depicted in FIG. 8B is an exemplary system 800 for implementing a network-based embodiment of the present invention. Such a network-based embodiment is suitable for users who wish to access and/or receive alerts from the monitoring and overflow apparatus described herein via a network.

This exemplary system includes, inter alia, a computing device 802 and server 808, which interface to each other via network 806. Server 806 includes has access to content store 810, wherein data and/or data files are stored. In some environments, content store 810 and is a database or the like. Such data may be located in a content store resident on server 808, an independent database or other memory accessible by server 808, a similar content management system, a disk storage or other similar system suitable for storing and accessing electronic files. Database 810 has one or more content files which are accessible from server 808. In certain embodiments, a server 808 provides networked access (through download or streaming) to the content files via communication connections 812 to make those files accessible on computing device 802. It should be noted as that computing device 802 has a system memory suitable for local temporary or permanent storage of content files. In some embodiments of the present invention, network 806 is the Internet and computing device has an Internet connection that allows content to be downloaded, streamed, or the like from the remote server 808. The depicted computing system environment depicted in FIG. 8B is exemplary of one suitable computing environment and is not intended to suggest any limitation as to the scope of use or functionality.

Numerous other general purpose or special purpose computing system environments, computing devices, and configurations may be used or substituted. Examples of well-known computing systems, devices, environments, and/or configurations that may be suitable for use include, but are not limited to, personal computers ("PCs"), server computers, handheld or laptop devices, multi-processor systems, microprocessor-based systems, network PCs, minicomputers, mainframe computers, e-readers, cell phones, tablets, embedded systems, distributed computing environments that include any of the above systems or devices, and the like.

Figure 8A:
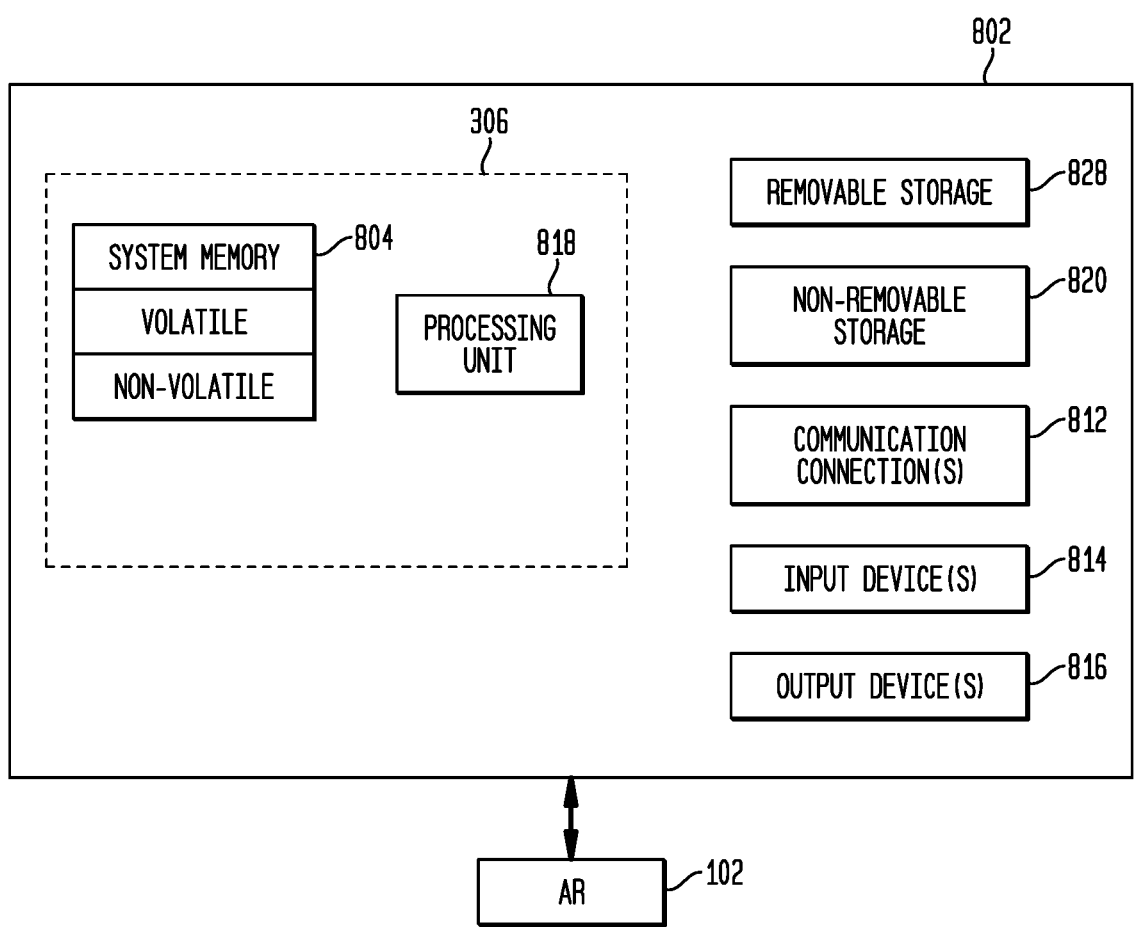
FIG. 8A depicts a block diagram of an exemplary computing device with which various embodiments of the present invention may be implemented.
Figure 8B:
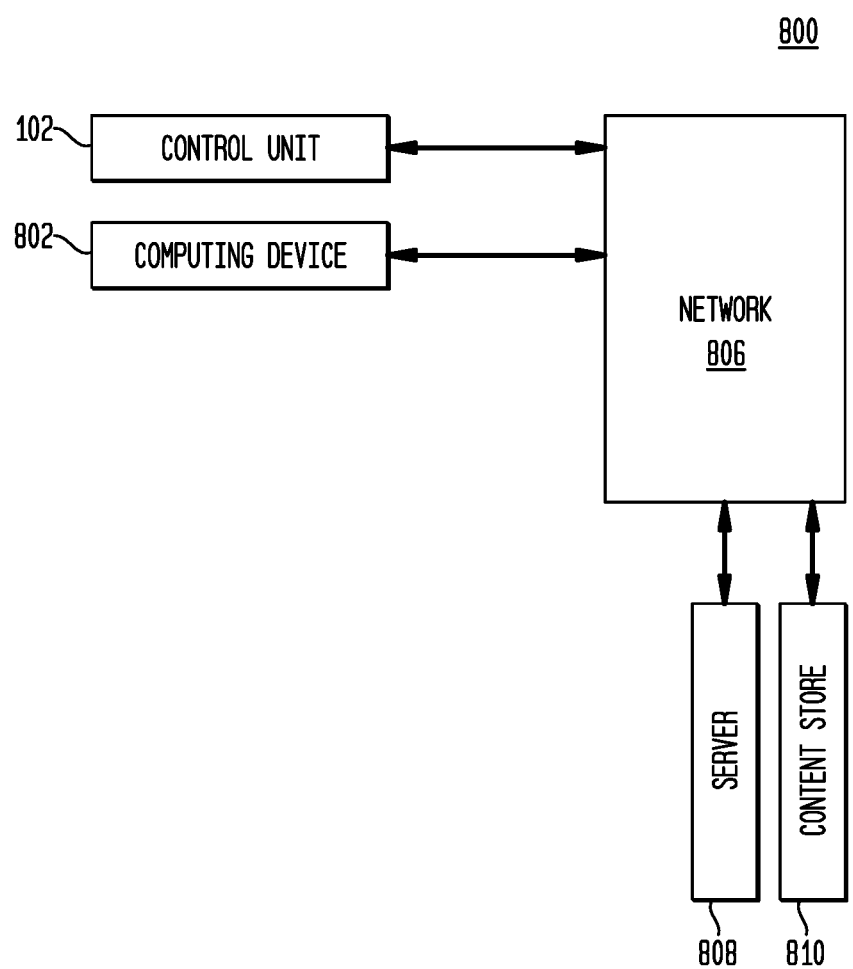
FIG. 8B depicts a schematic view of an exemplary network environment within which various embodiments of the present invention may be implemented.

FIG. 8A depicts a schematic view of an exemplary computing device 802 on which will various embodiments of the present invention may be implemented in a standalone manner or in a networked manner as described herein. It should be noted that server 808 is in itself a computing device and has a substantially identical or similar structure to that discussed for computing device 802. In the present invention, a computing device 802 may be a smartphone or the like that communicates with a control unit of an overflow and monitoring apparatus of the present invention via a home network or Internet via the processes described herein with respect to FIGS. 6 and 9-11.

Computer-executable instructions such as programs or program modules executed by a computing device or processing unit may be used. Generally, program modules include routines, programs, objects, components, data structures, etc. that perform particular tasks. Distributed computing environments may be used where tasks are performed by remote processing devices that are linked through a communications network or other data transmission medium. In a distributed computing environment, program modules and other data may be located in both local and remote computer storage media including memory storage devices.

Computing device 802, in its most basic configuration as depicted in FIG. 8A, includes at least one processing unit 818 and at least one memory 804. Depending on the exact configuration and type of the computing device, memory 804 may be volatile (such as random-access memory ("RAM")), non-volatile (such as read-only memory ("ROM"), flash memory, etc.), or some combination of the two. In addition to that described herein, computing device 802 can be any network-accessible device (e.g., cell phone, smart phone, e-reader, personal computer, or the like) including those operating via Android, Apple, and/or Windows mobile or non-mobile operating systems.

Computing device 802 may have additional features/functionality. For example, computing device 802 may include additional storage (removable and/or non-removable) including, but not limited to, magnetic or optical disks or tape, thumb drives, and external hard drives as applicable. Such additional storage is illustrated in FIG. 8A by removable storage 828 and non-removable storage 820.

Computing device 802 typically includes or is provided with a variety of computer-readable media. Computer-readable media can be any available media that can be accessed by computing device 802 and includes both volatile and non-volatile media, removable and non-removable media. By way of example, and not limitation, computer-readable media may comprise computer storage media and computer memory which contains on a transitory basis communication media that are streamed to device 802 via communication connections 812.

Computer storage media includes volatile and non-volatile, removable and non-removable media implemented in any method or technology for storage of information such as computer-readable instructions, data structures, program modules or other data. Memory 804, removable storage 828, and non-removable storage 820 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 802. Any such computer storage media may be part of computing device 802 as applicable.

Computing device 802 may also contain communications connection 812 that allows the device to communicate with other devices. Communication media typically embodies computer-readable instructions, data structures, program modules and/or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 802 may also have input device(s) 814 such as keyboard, mouse, pen, voice input device, touch input device, etc. Output device(s) 816 such as a display, speakers, printer, etc. may also be included. All these devices are generally known to the relevant public and therefore need not be discussed in any detail herein except as provided.

Notably, referring back to FIG. 8B, computing device 802 may be inter-connected with network 806. As may be appreciated, network 806 may be any appropriate network and computing device 802 may be connected thereto by way of an interface such as communication connections 812 in any appropriate manner, and computing device 802 may communicate with one or more of the other computing devices via network 806 in any appropriate manner. For example, network 806 may be a wired network, wireless network, or a combination thereof within an organization or home or the like and may include a direct or indirect coupling to an external network such as the Internet or the like. Likewise, network 806 may be such an external network including, without limitation, the Internet.

Computing device 802 may connect to server 808 via an internal or external network. Although FIG. 8B depicts computing device 802 located in close proximity to server 808, this depiction is not intended to define any geographic boundaries. For example, when network 806 is the Internet, computing device can have any physical location. For example, computing device may be a tablet, cell phone, personal computer, e-reader, or the like located at any user's office, home, etc. Or computing device could be located proximate to server 808 without departing from the scope hereof. Also, although FIG. 8B depicts computing device 802 coupled to server 808 via network 806, computing devices may be coupled to server 808 via any other compatible networks including, without limitation, an intranet, local area network, or the like.

In FIG. 8B the depicted embodiment of system 800 uses a standard client server technology architecture, which allows users of system 800 to access information stored in content store 810 via a user interface. The application or program may be in communication with a server such as server 808 which is accessible via a network such as the Internet using a publicly addressable Uniform Resource Locator ("URL") to receive content to display. For example, users can access content from exemplary system 800 using any web-enabled device equipped with a web browser. Communication between software component and sub-systems are achieved by a combination of direct function calls, publish and subscribe mechanisms, stored procedures, and direct SQL queries, however, alternate components, methods, and/or sub-systems may be substituted without departing from the scope hereof.

In the depicted embodiment, computing device 802 may be equipped with one or more Web browsers to allow them to interact with server 808 via a Hypertext Transfer Protocol ("HTTP"). HTTP functions as a request-response protocol in client-server computing. For example, a web browser operating on computing device 802 may execute a client application that allows it to interact with applications executed by server 808. The client application submits HTTP request messages to the server. Server 808, which provides resources such as HTML files and other content or performs other functions on behalf of the client application, returns a response message to the client application upon request. The response typically contains completion status information about the request as well as the requested content. However, alternate methods of computing device/server communications may be substituted without departing from the scope hereof.

In the exemplary system 800, computing device 802 stores in its system memory 804 (FIG. 8A) one or more data files (e.g., files that contain alarm, status, and fault information or the like) stored in a format suitable for transferring over the network and processing at the computing device 802. Examples of suitable file formats for content stored in the content store include: ASCII, PDF, TXT, .DOC, id, .lrx, .chm, .epub, or the like.

As shown in FIG. 8A, a computing device 802 has a system memory that is locally attached and/or integrated into computing device 802. The local content store contains files suitable for processing by the system described herein. Such files may be obtained for storage on the memory 804, removable storage 828, and/or non-removable storage 820 through various techniques including, but not limited to, having been: downloaded via a network connection (e.g., from a network via communication connection 812); stored in a local buffer as a part of a media stream; pre-loaded on memory 804, removable storage 828, and/or non-removable storage 820; generated locally at the computing device; transferred from a removable storage device 828 (e.g., a flash drive) to memory 804; or similar methods of obtaining electronic files for storage on a storage device.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in as code in a high-level procedural or object-oriented programming language to communicate with a computer system. However, the program(s) can be implemented in assembly language or machine language, if desired. In any case, the code may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as system 800 or a distributed computing environment. Still further, aspects of the presently disclosed subject matter may be implemented in or across a plurality of processing chips or devices, and storage may similarly be effected across a plurality of devices in or connected with system 800. Such devices might include personal computers, network servers, and handheld devices (e.g., cell phones, tablets, smartphones, etc.), for example. In the exemplary embodiment, computing device 802 is programmed to execute a plurality of processes including those referenced with respect to FIGS. 5, 6, and 9-11 as discussed in greater detail below.

Referring back to FIGS. 6 and 9-11, initially, a user registers an account using a process such as process 601 as shown in FIG. 6. First, at 602, the user downloads or otherwise installs the application. For example, in one embodiment of the invention, a mobile application is downloaded from an application store such as Google's Play Store or Apple's App Store. Process 601 then proceeds to 604, at which the user enters the data required by the new account registration form. This data may include, for example, user ID, password, and the like. Process 601 then proceeds to 606, at which the user's information is saved to a content store such as content store 810 (FIG. 8B) or the like.

Figure 9:
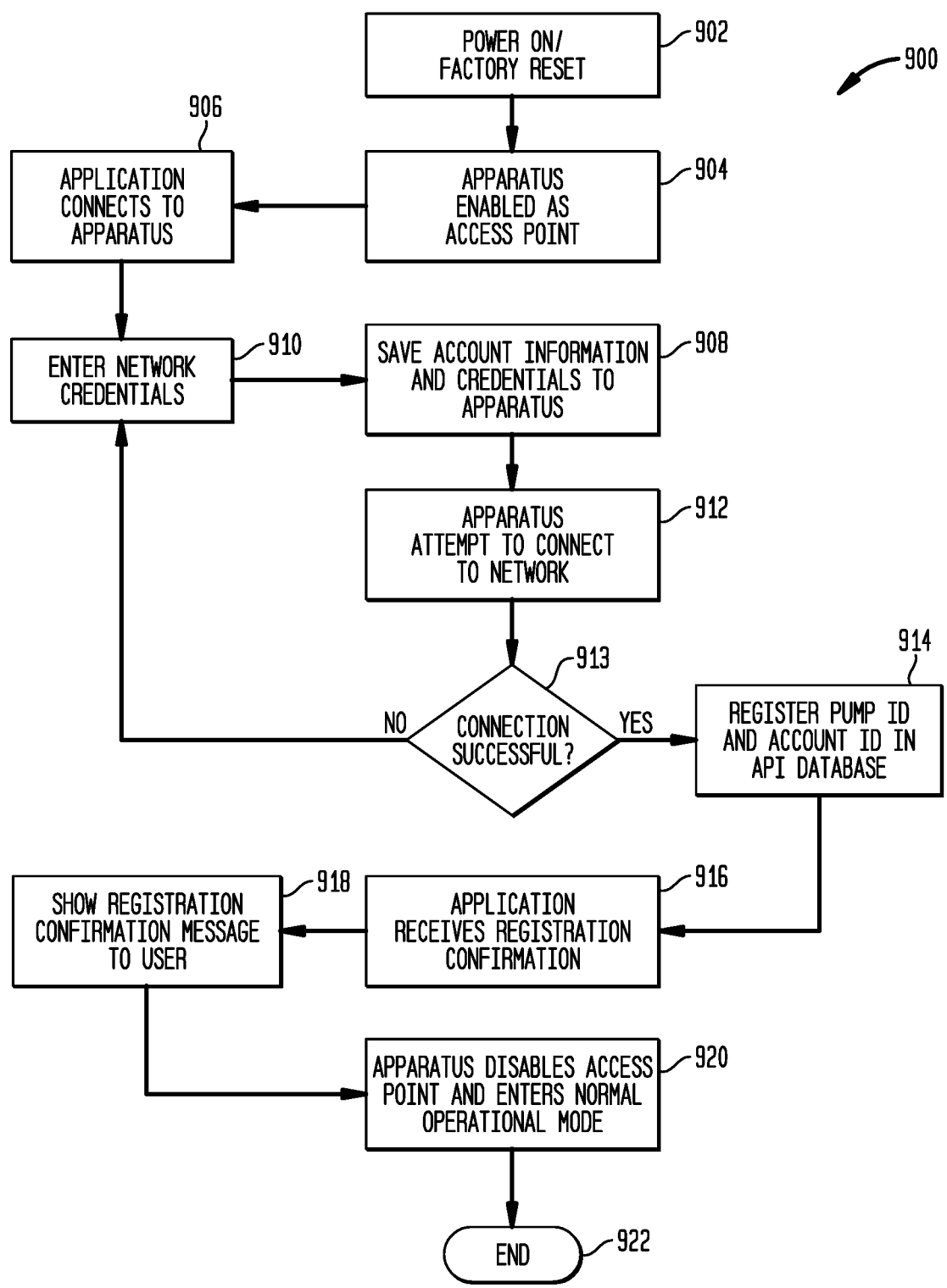
FIG. 9 is a flowchart depicting a pump registration function of an application designed for use with the embodiment of the present invention depicted in FIG. 1.

Turning now to FIG. 9, depicted is a process 900 for registering an overflow and monitoring protection apparatus such as apparatus 100 of FIGS. 1A and 1B. Process 900 begins at 902, at which the apparatus, or the control system thereof, is energized. This may occur upon initially powering up apparatus 100. Process 900 then proceeds to 904, at which the control unit enables the apparatus to be available as a network access point. Next, at 906, the application connects to the apparatus via the network access point and the network access of the computing device (e.g., a computing device such as computing device 802 of FIG. 8A) on which the application is executed.

Process 900 then proceeds to 910, at which the user is able to enter network credentials such as, but not limited to, network password. Next, at 908, the account information entered by the user during the account registration process (e.g., process 600 of FIG. 6) as well as the network credentials entered at step 910 are saved in the control unit of the apparatus such as apparatus 100. Process 900 then proceeds to 912, at which the apparatus attempts to connect to the network using the network credentials entered at step 908. Process 900 then proceeds to 913, at which it determines whether the connection attempt is successful. If no, process 900 returns to step 910, at which the network credentials may be re-entered. If, at 913, the connection is successful, process 900 proceeds to 914, at which the control unit of the apparatus transmits its identification information and account registration information to a main database via a network to a server for storage on a content server associated therewith. Thereafter, process 900 proceeds to 916, at which the application receives a confirmation of registration of the apparatus to be added to the user's application. Next, at 918, a registration confirmation message is displayed to the application user. Process 900 then proceeds to 920, at which the apparatus disables the network access point and enters its normal operation. Finally, process 900 proceeds to 922 at which it ends.

Figure 11:
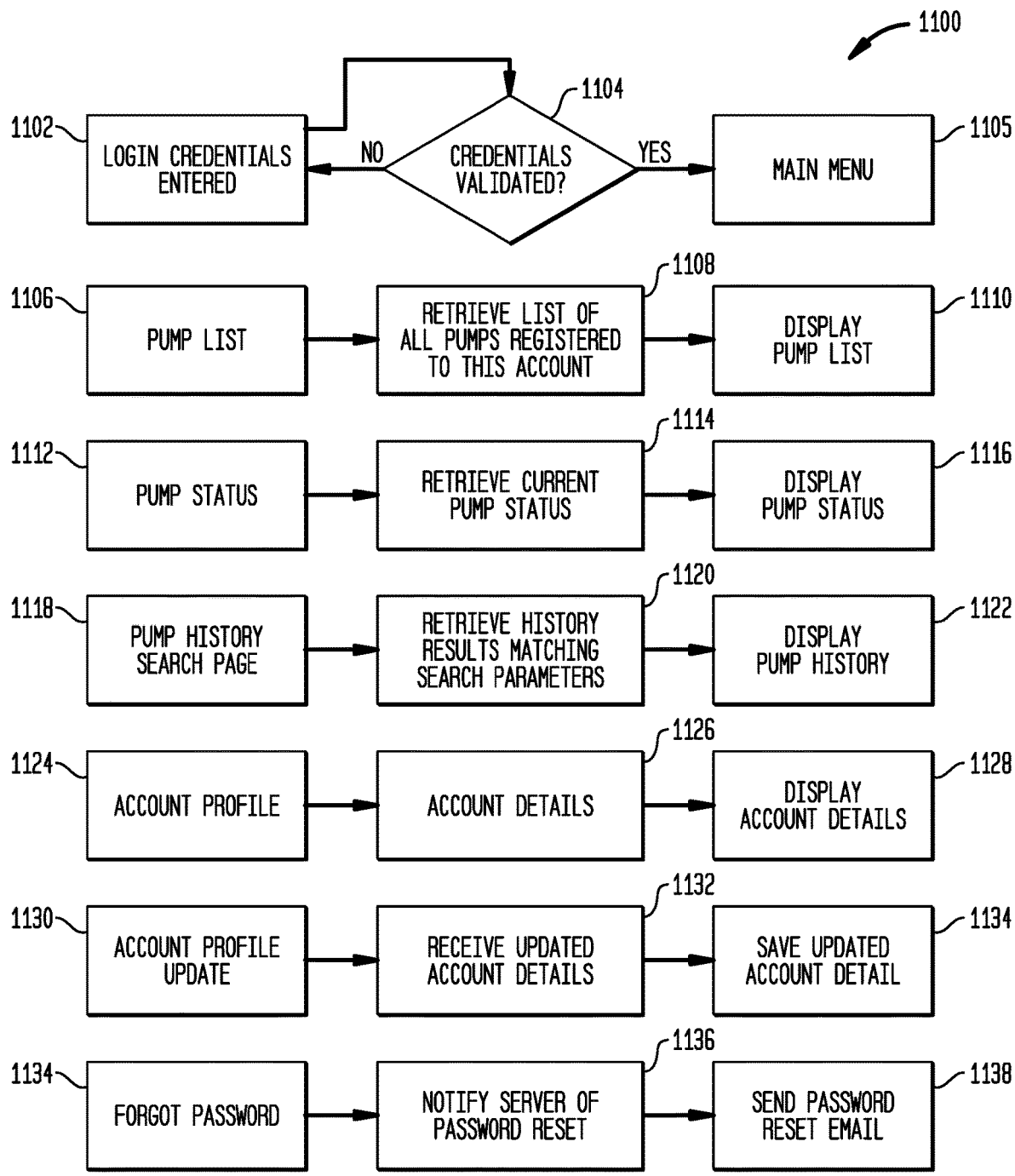
FIG. 11 is a flowchart depicting the various functions available via a menu of an application designed for use with the embodiment of the present invention depicted in FIG. 1.

Referring now to FIG. 11, depicted is process 1100 for utilizing the application after it has been initialized and/or coupled via a network to the overflow and monitoring apparatus. Process 1100 starts at 1102, at which a user logs in to the application using the login criteria entered when the account was initially registered, for example, using a process such as process 600 as shown above in FIG. 6. Process 1100 then proceeds to 1104, at which the login credentials are validated by the system server. That is, login credential validation may include sending the login credentials from the application to the API to the system server. The system server then compares the login credentials against the account information stored in the content server. If the login credentials do not match, they are not validated, and process 1100 returns to step 1102 at which the login information may be re-entered. Alternatively, if the login credentials match those on file with the server's content store, the login is validated, and process 1100 proceeds to step 1105, at which the main menu is presented to the user.

In the depicted embodiment, the main menu offers the following options: pump list 1106, pump status 1112, pump history 1118, account profile 1124, and forget password 1134. However, alternate embodiments are envisioned in which one are more options are omitted or alternative options are added without departing from the scope of the present invention. If a user selects pump list from the main menu at 1106, process 1100 executes 1108, at which the application API queries the remote server via the network for a list of all pumps associated with the user's account. Once retrieved, the list of pumps is displayed to the user at the display device of the computing device executing process 1100 at step 1110.

If a user selects pump status from the main menu at 1112, process 1100 executes 1114, at which the application API queries the remote server via the network for a list of the statuses of all pumps associated with the user's account. Once retrieved, the list of pump statuses is displayed to the user at the display device of the computing device executing process 1100 at step 1116. In the depicted embodiment, the pump status includes the time of the last detected heartbeat. However, alternate methods of determining and depicting pump status may be substituted without departing from the scope hereof.

If a user selects pump history from the main menu at 1118, process 1100 executes 1120, at which the application API queries the remote server via the network for the history of the selected pump. Once retrieved, the pump history is displayed to the user at the display device of the computing device executing process 1100 at step 1122. In the depicted embodiment, the pump history includes a history of detected heartbeats, pump on commands, pump off commands, and the like. However, alternate methods of determining and depicting pump history may be substituted without departing from the scope hereof.

If a user selects account profile from the main menu at 1124, process 1100 executes 1126, at which the application API queries the remote server via the network for the account details associated with the user's account. Once retrieved, the account details are displayed to the user at the display device of the computing device executing process 1100 at step 1128. In the depicted embodiment, the account details include information such as user ID, password, and the like. However, one or more account details may be omitted, and/or alternate account details may be substituted without departing from the scope hereof. In the depicted embodiment, in addition to displaying the account details at 1128, the application also displays the option for the user to update his or her account profile at 1130. If selected, process 1100 proceeds to 1132, at which the new account details are received from the user via a data entry screen displayed by the application. Once the new data is entered by the user, process 1100 proceeds to 1134, at which the information is sent to the server by the API for storage in the content store.

Finally, if a user selects forgot password from the main menu at 1134, process 1100 executes 1136, at which the application API notifies the remote server via the network that the user wishes to reset his or her password. Next, at 1138, the server sends a password to the e-mail address associated with the user with instructions regarding entry of new password information. In the depicted embodiment, the e-mail also requires verification of the user's identity. The user's response to the e-mail is sent directly to the server upon which the new login information is saved in the content store. However, alternate methods of resetting a password may be substituted without departing from the scope hereof.

Figure 10:
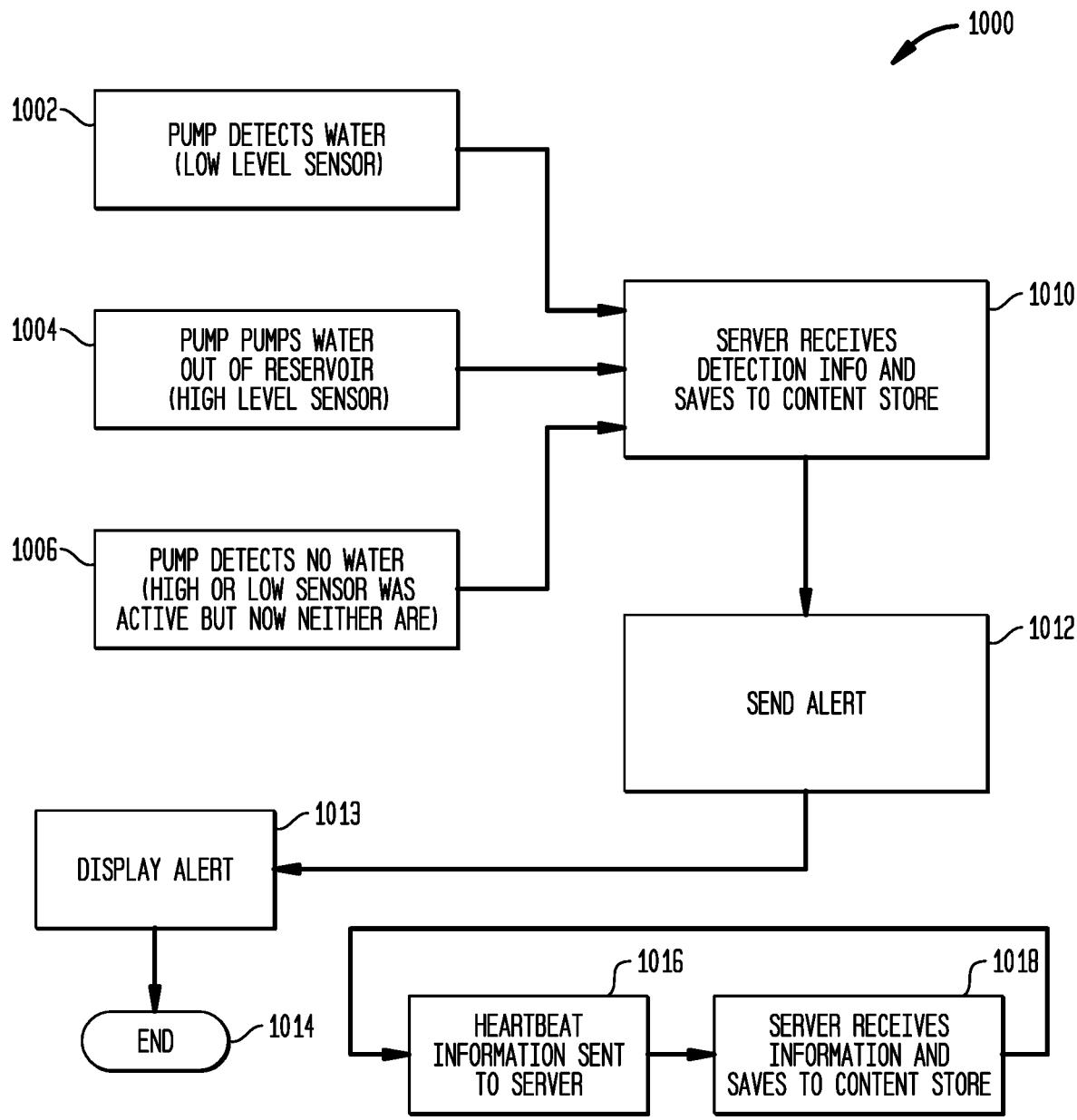
FIG. 10 is a flowchart depicting the pump operational mode of an application designed for use with the embodiment of the present invention depicted in FIG. 1.

Referring now to FIG. 10, depicted is a flowchart of the operational mode process 1000 of the overflow and monitoring apparatus 100. As shown in FIG. 10, upon the occurrence of a low fluid detection (step 1002), high fluid detection (step 1004), or no fluid detection (1006), process 1000 proceeds to 1010, at which the overflow and monitoring apparatus initiates communication with the server. At 1010, the corresponding detection (i.e., low fluid detection, high fluid detection, no fluid detection, respectively) is transmitted to the system server via the network and the corresponding detection information is saved by the server into the content store. Thereafter, process 1000 proceeds to 1012, at which the server sends an alert to the application via the network. Next, at 1013, the alert is displayed to the user at a display device associated with the computing device running the application. Thereafter, process 1000 proceeds to 1014 at which it ends. Simultaneously, at 1016, the control unit of the overflow and monitoring apparatus transmits a heartbeat on a timed basis, for example, every 24 hours. Information regarding the absence or presence of a heartbeat is transmitted to the system server via the network and the corresponding heartbeat information is saved by the server to the content store at 1018. Steps 1016 and 1018 repeat according to a pre-programmed time schedule.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An overflow protection and monitoring apparatus for a drainage pan comprising:
   a drainage line;
   a base, the base including an input port, a dry section, and a wet section, the input port capable of coupling to the drainage pan;
   a base cover, the base cover removably coupled to the base, the base cover including a base cover output port capable of coupling to the drainage line;
   a fluid displacement mechanism located in the wet section, the fluid displacement mechanism including a fluid displacement mechanism output port;
   a fluid detection mechanism located in the wet section; and
   a base attachment, the base attachment coupled to the fluid displacement mechanism output port and the base cover output port, the base attachment including an air relief port and back-flow preventer;
   a control unit capable of energizing the fluid displacement mechanism upon receiving a signal from the fluid detection mechanism.

2. An apparatus according to claim 1 further comprising:
   a base cover aperture located in the base cover, the base cover aperture adapted to encircle the drainage line when said drainage line is coupled to said base cover output port.

3. An apparatus according to claim 1 further comprising:
   at least one user interface feature integral to the base cover, the at least one user interface feature including a fault indicator, a ready indicator, a silence button, a factory reset button, or combinations thereof.

4. An apparatus according to claim 1,
   wherein a longitudinal base side of the base and a longitudinal cover side of the base cover have a corresponding shape that facilitates placement of the apparatus adjacent a circular drain pan.

5. An apparatus according to claim 4, wherein the corresponding shape is slightly concave.

6. An apparatus according to claim 1, wherein the base cover couples to the base via a snap fit.

7. An apparatus according to claim 1, wherein the fluid detection mechanism includes a high level sensor, a low level sensor, or combinations thereof.

8. An apparatus according to claim 1, further comprising: at least one handle.

9. An apparatus according to claim 8, wherein the at least one handle is substantially convex and extends outwardly beyond an exterior surface of the base to provide at least one air vent.

10. An apparatus according to claim 1, wherein the base attachment is adapted to evacuate air from an impeller chamber of the fluid displacement mechanism.

11. An apparatus according to claim 1, wherein the back-flow preventer includes at least one obstruction.

12. An apparatus according to claim 11, wherein the at least one obstruction is spherical.

13. An apparatus according to claim 1, wherein the fluid detection mechanism includes at least one conductivity sensor.

14. A method of installing an overflow protection and monitoring apparatus comprising the steps of:
   coupling the overflow protection and monitoring apparatus to a drainage pan in a position exterior to the drainage pan, the overflow protection and monitoring apparatus for a drainage pan comprising:
      a drainage line;
      a base, the base including an input port, a dry section, and a wet section, the input port capable of coupling to the drainage pan;
      a base cover, the base cover removably coupled to the base, the base cover including a base cover output port capable of coupling to the drainage line;
      a fluid displacement mechanism located in the wet section, the fluid displacement mechanism including a fluid displacement mechanism output port;
      a fluid detection mechanism located in the wet section; and
      a base attachment, the base attachment coupled to the fluid displacement mechanism output port and the base cover output port, the base attachment including an air relief port and back-flow preventer;
      a control unit capable of energizing the fluid displacement mechanism upon receiving a signal from the fluid detection mechanism;
   placing the overflow protection and monitoring apparatus adjacent to the exterior of the drainage pan;
   extending a drainage line from the overflow protection and monitoring apparatus to a drainage location; and
   plugging a power supply connector into the apparatus and a power receptacle.

15. A method according to claim 14 further comprising the step of:
   coupling a first end of the drainage line to the overflow protection and monitoring apparatus.

16. A method according to claim 14, wherein the coupling the overflow protection and monitoring apparatus to a drainage pan includes passing the input port through an drainage pan aperture in the drainage pan.

17. A method according to claim 14 further comprising the step of:
   registering the overflow protection and monitoring apparatus.

18. A method according to claim 14 further comprising the step of:
   accessing one or more statuses of the overflow protection and monitoring apparatus via an application.

* * * * *